United States Patent [19]

Hutchison

[11] Patent Number: 4,490,965
[45] Date of Patent: Jan. 1, 1985

[54] RIDING MOWER LINKAGE

[75] Inventor: Wayne R. Hutchison, Mayville, Wis.

[73] Assignee: Deere & Company, Moline, Ill.

[21] Appl. No.: 500,466

[22] Filed: Jun. 2, 1983

[51] Int. Cl.³ .................... A01D 69/08; A01D 75/20
[52] U.S. Cl. ...................................... 56/11.6; 56/10.2
[58] Field of Search ............... 56/10.8, 11.3, 11.6, 56/10.2, DIG. 15, 17.4, 17.5, DIG. 22; 192/11, 129 A

[56] References Cited

U.S. PATENT DOCUMENTS

| 3,367,459 | 2/1968 | Rubin | 56/11.6 |
| 3,626,676 | 12/1971 | Miley et al. | 56/10.2 |
| 3,633,699 | 1/1972 | Bishop | 192/11 |
| 3,773,156 | 11/1973 | Nyquist | 56/10.2 |
| 3,969,875 | 7/1976 | Nofel | 56/10.2 |
| 3,985,196 | 10/1976 | Deschamps | 56/10.2 |
| 4,058,957 | 11/1977 | Roseberry | 56/11.6 |
| 4,068,452 | 1/1978 | Schaefer et al. | 192/11 |
| 4,231,215 | 11/1980 | Klas | 56/11.6 |
| 4,285,419 | 8/1981 | Anderson | 56/11.3 |

Primary Examiner—Gene Mancene
Assistant Examiner—John Weiss

[57] ABSTRACT

A linkage system riding mower have an operator station located lever positionable between a first and second position corresponding respectively to a disengaged and engaged state of an attached mower deck. The linkage system cooperated with an interlock switch which shut down the vehicle engine should the vehicle operator disembark the vehicle while the mower deck is engaged.

2 Claims, 2 Drawing Figures

RIDING MOWER LINKAGE

BACKGROUND OF THE INVENTION

This invention relates to a means for coupling the power take-off of a riding mower to a mower deck.

Some riding mower tractors of the lawn and garden variety include a power take-off in-belt communication with a mower deck. It is customary to include a positionable spindle on the mower deck. A linkage system between the operator's station and the positionable spindle governers the spindle position. During the manufacturing process slight variations between vehicles may cause some misalignment problems in the mating of the linkage system to the positionable spindle. The misalignment can be aggravated should the vehicle include a mower interlock switch which is activated by the linkage system and which constitutes a linkage position adjustment constraint. The interlock switch communicates with other vehicle electrical components such that should the operator remove himself from the operator's seat while the power take-off is in the engaged position, the switch will cause the vehicle engine to stop.

Further, as results of prolonged use wear changes the belt drive characteristics between the vehicle's power take-off and the drive spindle on the mower deck effecting the engaging position of the positionable spindle will change over time. This position change will effect the linkage system such that misalignment may develop between the interlock switch and the linkage system causing the switch to become nonfunctional.

SUMMARY OF THE INVENTION

A mounting plate is mounted to the steering column or other such suitable location of the tractor's operator station. The mounting plate supports in fixed location a interlock switch. A second member is pivotably mounted to the mounting plate positionable by a handled lever between a first position and a second position whereby in the second position the member is in biasing communication to the contact needle of the interlock switch. The second member has pivotably mounted thereto a linking rod extending down to a slotted lever. The lever is pivotably mounted to the vehicle and has a second lever arm pivotably connected to a wear compensating linking member. The wear compensating linking member in turn communicates with the positionable spindle pivotably mounted to a mower deck housing.

DESCRIPTION OF THE PREFERRED EMBODIMENT

Figure 1:
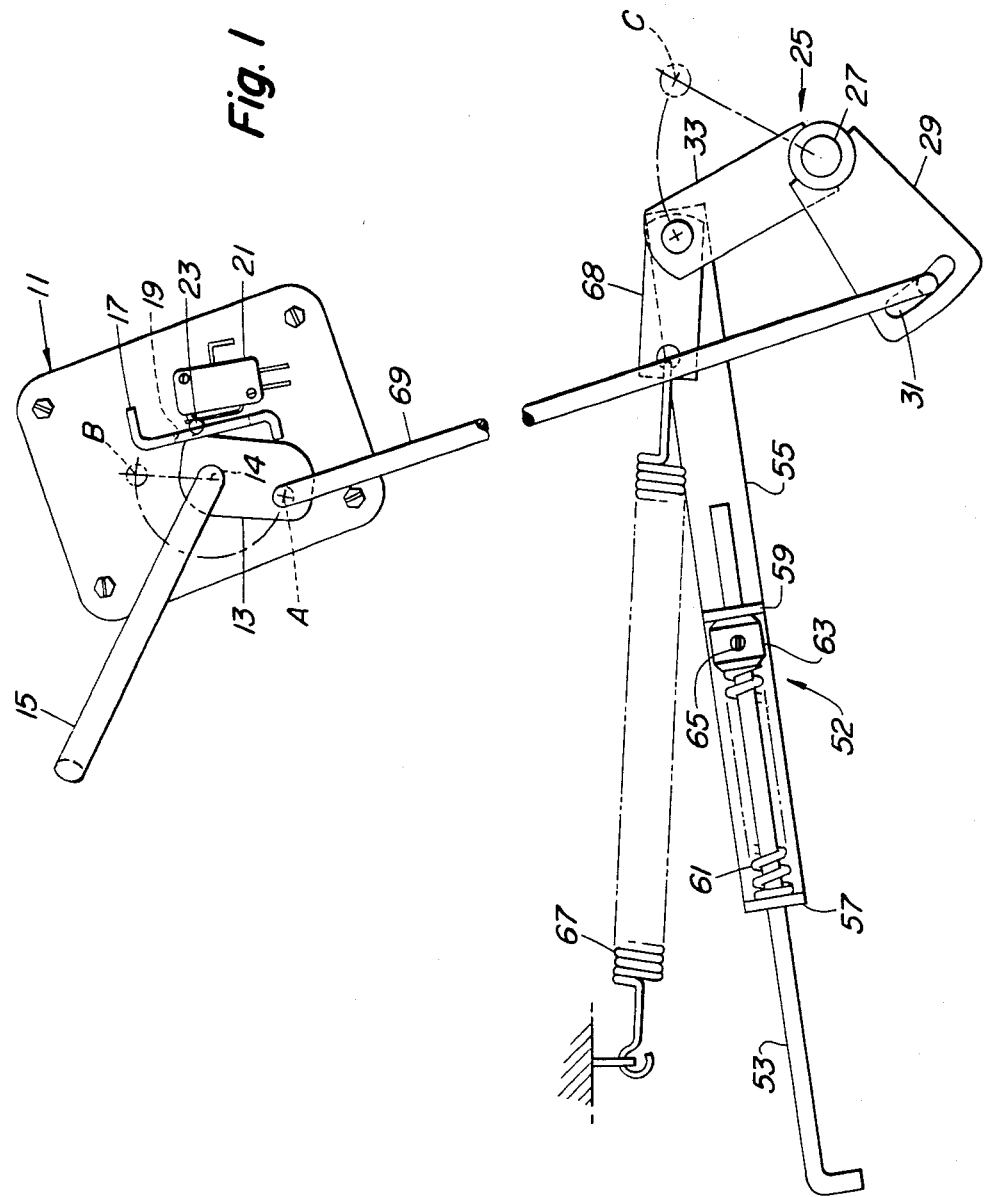
FIG. 1 is a schematic representation of a linkage system in accordance with the present invention.

Referring now to FIG. 1 a mounting plate 11 is fixably mounted to a steering column or the like by any conventional means (not shown). A generally rectangular second member 13 is pivotably mounted to the mounting plate 11 by any conventional means at 14 such that it can be rotated about 14 by a handle lever 15 between a first and second position indicated respectively as A and B. Further movement of the second member 13 beyond position B and, also A is restrained by the stop member 17 fixably mounted to the mounting plate 11 by any conventional means. The stop member 17 contains a generally vertically elongated slot 19. An interlock switch 21 is fixably mounted to the mounting plate 11 by any conventional means. The switch 21 is mounted such that its contact needle 23 journeys into slot 19. When the member 13 is pivoted to the second position B, member 13 biases the switch needle 23 "ON". In the first position A, the member 13 is displaced from the switch needle 23 to place the switch "OFF".

A lever 25 is pivotably mounted by any conventional means around a pin 27 fixably mounted by any conventional means to the vehicle (not shown). The lever 25 has a first lever arm 29 containing a slot 31 therein and a second lever arm 33 extending generally perpendicular with respect to the first lever arm 29.

Figure 2:
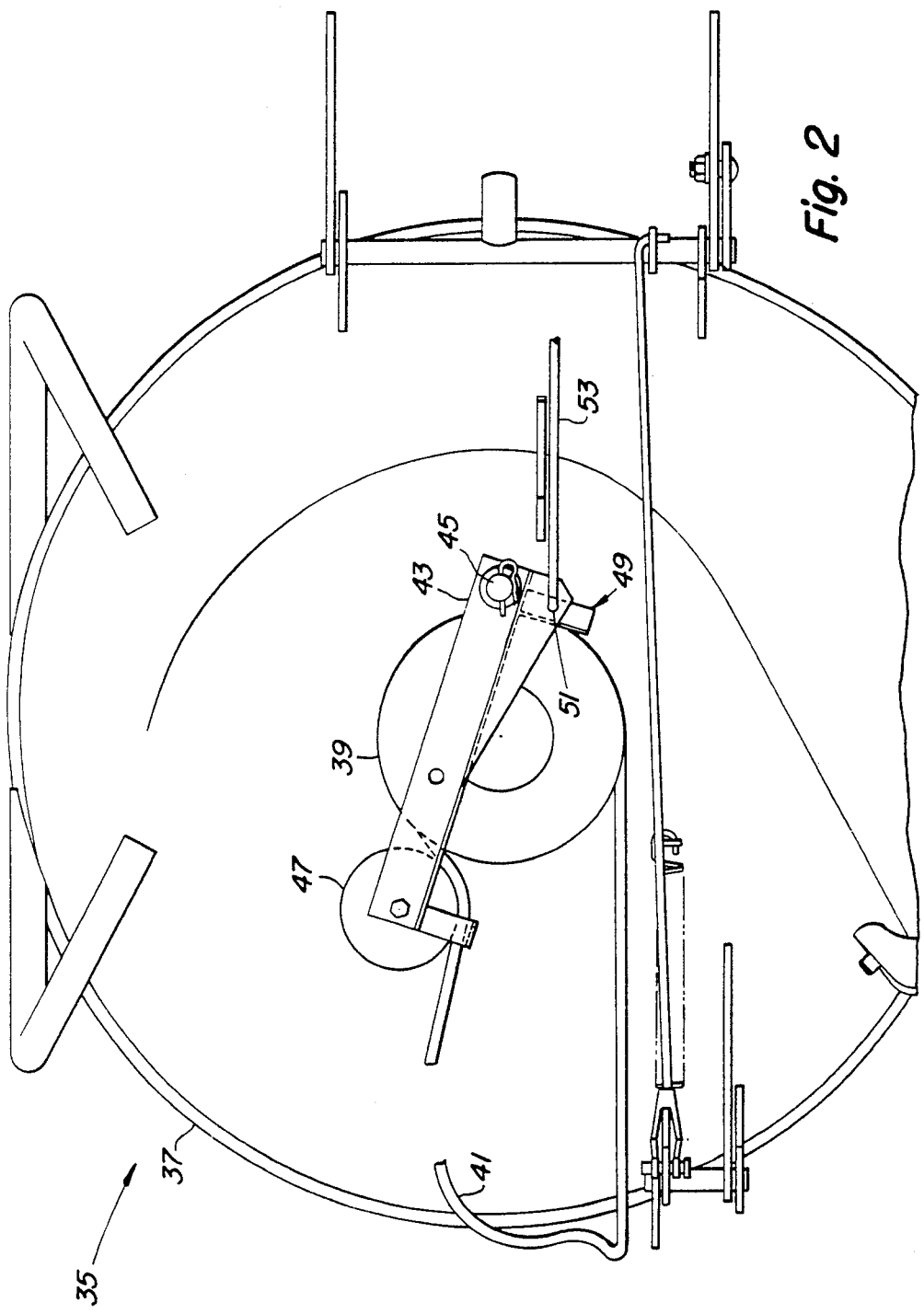
FIG. 2 shows a mower deck in communication with the linkage system.

Referring to FIG. 1 and, more particularly, to FIG. 2, a mower deck 35 of generally conventional design includes among other components, a housing 37 having an open face bottom housing rotatably a plurality of cutter blades in a conventional manner (not shown). Rotatably mounted atop the mower housing 37 in driving communication with the mower blades by any conventional means is a first spool 39. An endless belt 41 extends from around the tractor PTO output spindle (not shown) and around the spindle 39 of the mower deck. A PTO clutch arm 43 is pivotably mounted around a vertically extending shaft 45 atop the mower housing 37 by any conventional means. The PTO clutch arm 43 includes a spindle 47 rotatably mounted by any conventional means to one end of the PTO clutch arm 43 horizontally opposite to belt 41. The clutch arm 43 includes a portion 49 radially removed from the pivotal center of the clutch arm 43 having a hole 51 extending through portion 49.

A wear compensating linking member generally indicated as 52 includes a rod 53 and a lever 55. The lever 55 is pivotally mounted by any conventional means at one end to lever arm 33. Lever 55 further includes a first stop 57 fixably mounted at one end of lever 55 by any conventional means and a second stop 59 fixably mounted by any conventional means to lever 55 in spaced apart relationship to stop 57. The rod 53 has one end pivotally mounted by any conventional means in hole 51. The other end of rod 53 extends into and beyond stops 57 and 59. A spring 61 is placed around the rod 53 portion between stops 57 and 59. A set nut 63 is also placed around rod 53 and fixably mounted thereto by any conventional means such as by set screw 65. The set nut 63 is located between one end of spring 61 and stop 59.

A second spring 67 is mounted fixably to the vehicle at one end by any conventional means and extends and is fixably mounted to a lever 68. Lever 68 in turn is pivotally mounted to the seocnd lever arm 33 by any conventional means. Further, a linking rod 69 is pivotally mounted in member 13 at one end by any conventional means and slidably mounted in slot 31 at the other end by any conventional means.

In operation, the linkage system first assumes a first or disengage position "A", i.e. with the clutch spindle 47 in a non-biasing position relative to the endless belt 41 (as shown in the figures). To engage the PTO clutch arm 43, a vehicle operator would displace the handled lever 15 to a second position indicated as B bringing member 13 into biasing contact with contact needle 23 of interlock switch 21 and causes linking rod 69 to bottom in slot 31 and thereafter pivot lever 25. The contact needle is actually full closed or "off" as soon as the rod 67 is bottomed in slot 31. The pivoting of lever 25 causes the second lever arm to archably displace to a position C, displacing lever 55. The displacement of lever 55 acts upon spring 61 and set nut 63 through stop 57 to displace rod 53. As rod 53 is displaced, PTO clutch arm 43 is pivoted about shaft 45, indicated by arrow, to bring spindle 47 into biasing contact with belt 41 placing the vehicles PTO and belt driven communication with spinle 39. Note that the handled lever 15 rotates member 13 and linking rod 69 over center location 14 to maintain the achieved displacements. The spring 67 function as a return spring when the handled lever is rotated back to its original position A.

It is observed that the linkage system includes a lost motion arrangement between linking rod 69 and lever arm 29 which relieves problem alignment variation between production vehicles. Further, the interlock switch 21 can be in electrical communication with the vehicles ignition system and a conventional seat switch in a conventional manner such that should the vehicle operator remove himself from the vehicle seat when the second member 13 is in the position indicated as B, the interlock switch 21 will cause the vehicle engine to shut off in a known manner, e.g. activating a solenoid to shut off fuel supply to the engine.

I claim:

1. In combination with a riding power vehicle having an operator's station and a power take off in endless belt driven communication with a mower deck mounted to said vehicle, said mower deck having a spindle rotatable mounted to said mower deck and in driving communication with a mower deck blade, said endless belt extending in part around said spindle and a power take of spindle, said mower deck further having a clutch arm pivotally mounted to said mower deck and a spindle rotatably mounted to said clutch arm aligned opposite a portion of said endless belt, an improved linkage system wherein the improvement comprises: a mounting plate fixably mounted in said operator's station; a stop member fixably mounted to said mounting plate; a member pivotally mounted in said operator's station pivotally positionable to a first or second position abutting to said stop member in said position such that said member pivots over center; a lever pivotally mounted to said vehicle including a first and second lever arm, said first lever arm including a slot; a linking rod pivotally mounted to said member at one end such that said linking rod travels over center upon pivotal displacement of said member and slidably mounted in said slot such that upon initial displacement of said member, said linking rod bottoms in said slot and further displacement of said member causes said linking member to rotate said lever; means for communicating said displacement of said lever to said clutch arm such that should said member be in said first position, said clutch arm spindle is biased by said means away from said endless belt and should said member be in said second position, said clutch arm spindle is biased against said endless belt, an interlock switch fixably mounted in said vehicle's operator's station having a contact needle extending through an opening in said stop such that said contact needle is biased to close said interlock switch when said member is in said second position.

2. A combination as claimed in claim 1 wherein said means comprises a third lever pivotally mounted to said second lever at one end having a first and second stop member fixably mounted to said third lever in spaced apart relationship; a rod pivotally mounted in said clutch arm at one end radially removed from the pivot center of said clutch arm and extending through and beyond said first and second stop members; a spring placed around said rod between said first and second stop members abutting to said first stop member; a set nut around said rod between said second stop and said spring to bias said spring against said first stop member.

* * * * *